(12) United States Patent
Lambright et al.

(10) Patent No.: US 6,728,836 B1
(45) Date of Patent: Apr. 27, 2004

(54) SEGMENTING CACHE TO PROVIDE VARYING SERVICE LEVELS

(75) Inventors: Daniel Lambright, Watertown, MA (US); Adi Ofer, Wellesley, MA (US); Natan Vishlitzky, Brookline, MA (US); Yuval Ofek, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/535,134

(22) Filed: Mar. 24, 2000

Related U.S. Application Data

(63) Continuation-in-part of application No. 09/434,611, filed on Nov. 5, 1999, now Pat. No. 6,457,102.

(51) Int. Cl.$^7$ .............................................. G06F 12/08
(52) U.S. Cl. ................................................... 711/129
(58) Field of Search ................................ 711/113, 118, 711/129, 153, 173; 707/101

(56) References Cited

U.S. PATENT DOCUMENTS

| | | | |
|---|---|---|---|
| 4,371,929 A | | 2/1983 | Brann et al. |
| 5,206,939 A | | 4/1993 | Yanai et al. |
| 5,357,623 A | * | 10/1994 | Megory-Cohen ........... 711/129 |
| 5,680,571 A | * | 10/1997 | Bauman ...................... 711/117 |
| 5,778,394 A | | 7/1998 | Galtzur et al. |
| 5,845,147 A | | 12/1998 | Vishlitzky et al. |
| 5,857,208 A | | 1/1999 | Ofek |
| 5,875,461 A | * | 2/1999 | Lindholm ................... 711/118 |
| 5,875,464 A | * | 2/1999 | Kirk ............................ 711/121 |
| 5,964,838 A | * | 10/1999 | Cheung et al. ............. 709/220 |
| 6,141,731 A | * | 10/2000 | Beardsley et al. .......... 711/133 |
| 6,182,194 B1 | * | 1/2001 | Uemura et al. ............. 711/129 |
| 6,295,580 B1 | * | 9/2001 | Sturges et al. .............. 711/129 |
| 6,347,358 B1 | * | 2/2002 | Kuwata ...................... 711/113 |
| 6,349,363 B2 | * | 2/2002 | Cai et al. .................... 711/129 |
| 6,360,303 B1 | * | 3/2002 | Wisler et al. ............... 711/147 |
| 6,381,676 B2 | * | 4/2002 | Aglietti et al. .............. 711/133 |
| 6,470,422 B2 | * | 10/2002 | Cai et al. .................... 711/129 |
| 6,493,800 B1 | * | 12/2002 | Blumrich .................... 711/129 |

FOREIGN PATENT DOCUMENTS

| | | |
|---|---|---|
| EP | 0497543 A2 | 8/1992 |
| WO | WO9201988 A | 2/1992 |

OTHER PUBLICATIONS

"Cache memories quicken access to disk data"; 2328 Electronic Design; vol. 30(1982) May, No. 10, Waseca, MN Denville, NJ "Systems and Software".

* cited by examiner

Primary Examiner—Hiep T. Nguyen
(74) Attorney, Agent, or Firm—Choate, Hall & Stewart

(57) ABSTRACT

Storing data in a cache memory of a storage device includes providing access to a first segment of the cache memory on behalf of a first group of external host systems coupled to the storage device and providing access to a second segment of the cache memory on behalf of a second group of external host systems coupled to the storage device, where at least a portion of the second segment of the cache memory is not part of the first segment of the cache memory. In some embodiments, no portion of the second segment of the cache memory is part of the first segment. Storing data in a cache memory of a storage device may also include providing a first data structure in the first segment of the cache memory and providing a second data structure in the second segment of the cache memory, where accessing the first segment includes accessing the first data structure and accessing the second segment includes accessing the second data structure. The data structures may be doubly linked ring lists of blocks of data. Each block of data may correspond to a track on a disk drive. Different groups of external host systems may be provided with different access, priority, and level of service with respect to the different segments of the cache.

18 Claims, 9 Drawing Sheets

| GROUP | LRU Mask |
|---|---|
| 1 | 11100000 |
| 2 | 00011000 |
| 3 | 00000110 |
| 4 | 00000001 |

| SLOT # | LRU |
|--------|-----|
| 0 | 1 |
| 1 | 1 |
| 2 | 2 |
| 3 | 2 |
| 4 | 2 |
| 5 | 2 |
| 6 | 3 |
| 7 | 4 |
| 8 | 4 |
| 9 | 4 |
| 10 | 4 |
| 11 | 4 |
| 12 | 4 |

SEGMENTING CACHE TO PROVIDE VARYING SERVICE LEVELS

CROSS REFERENCE TO RELATED APPLICATIONS

This application is a continuation-in-part of U.S. patent application Ser. No. 09/434,611 filed on Nov. 5, 1999 now U.S. Pat. No. 6,457,102.

BACKGROUND OF THE INVENTION

1. Field of the Invention

This application relates to the field of computer data storage and more particularly to the field of configuring a cache in a computer data storage system having multiple processors accessing the cache.

2. Description of Related Art

Host processor systems may store and retrieve data using a storage device containing a plurality of host interface units, disk drives, and disk interface units. Such storage devices are provided, for example, by EMC Corporation of Hopkington, Mass. and disclosed in U.S. Pat. No. 5,206,939 to Yanai et al., U.S. Pat. No. 5,778,394 to Galtzur et al., U.S. Pat. No. 5,845,147 to Vishlizzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

Performance of a storage system may be improved by using a cache. In the case of a disk drive system, the cache may be implemented using a block of semiconductor memory that has a relatively lower data access time than the disk drive. Data that is accessed is advantageously moved from the disk drives to the cache so that the second and subsequent accesses to the data may be made to the cache rather than to the disk drives. Data that has not been accessed recently may be removed from the cache to make room for new data. Often such cache accesses are transparent to the host system requesting the data.

One technique for implementing a cache is to store the data in blocks and link each of the blocks together in a doubly linked ring list referred to herein as a "logical ring unit" (LRU). Each block of the LRU represents a block of data from a logical disk unit. The blocks are placed in the doubly linked ring list in the order in which they are retrieved from the disk. A pointer may point to the block that was most recently added to the list. Thus, when a new block is to be added to the cache, the structure of the LRU, in combination with the head pointer, may be used to determine the oldest block in the LRU that is to be removed to make room for the new block.

A drawback with the LRU mechanism is that only one process may access and manipulate the ring list at a time since the complexity of the doubly linked ring structure makes it difficult to allow more than one process to manipulate to the data structure at any time. One way to enforce this one-at-a-time access is to use a software lock, which is a conventional semaphore-like mechanism that allows a process exclusive access to the LRU. However, when multiple processors need to use the cache, then the exclusive LRU access policy may become a bottleneck. In addition, in some instances, it may be desirable to provide a mechanism for adjusting cache services provided to the host processor systems coupled to the storage device so that some of the host processors may receive better cache performance than other ones of the host processors.

SUMMARY OF THE INVENTION

According to the present invention, storing data in a cache memory of a storage device includes providing access to a first segment of the cache memory on behalf of a first group of external host systems coupled to the storage device and providing access to a second segment of the cache memory on behalf of a second group of external host systems coupled to the storage device, where at least a portion of the second segment of the cache memory is not part of the first segment of the cache memory. In some embodiments, no portion of the second segment of the cache memory is part of the first segment.

Storing data in a cache memory of a storage device may also include providing a first data structure in the first segment of the cache memory and providing a second data structure in the second segment of the cache memory, where accessing the first segment includes accessing the first data structure and accessing the second segment includes accessing the second data structure. The data structures may be doubly linked ring lists of blocks of data. Each block of data may correspond to a track on a disk drive.

Storing data in a cache memory may also include apportioning the cache memory into slots and mapping each of the slots to at least one of the first and second segments of the cache memory. The slots may be mapped to the segments using a formula or a table. The groups may be mapped to particular ones of the segments using a table. The table may include group identifiers and corresponding masks. The masks may be binary values that have a "one" bit in an Nth bit position to indicate that a group is assigned to an Nth segment. Storing data in a cache memory may include, in response to a request for a block of cache memory, determining availability of a block of cache memory for a group mapped to the cache memory. In response to no blocks of cache memory for the group being available, a block of cache memory corresponding to another group may be provided. The block of cache memory that is provided may be at least one of: a next available block, a block corresponding to a group having a greatest number of blocks assigned thereto, a block corresponding to a group having a greatest number of available blocks, and a block corresponding to a group having a greatest percentage of available blocks.

According further to the present invention, a cache memory of a storage device includes a first segment of the cache memory that is accessed on behalf of a first group of external host systems coupled to the storage device and a second segment of the cache memory that is accessed on behalf of a second group of external host systems coupled to the storage device, where at least a portion of the second segment of the cache memory is not part of the first segment of the cache memory. In some embodiments, no portion of the second segment of the cache memory is part of the first segment.

The cache memory may also include a first data structure in the first segment of the cache memory and a second data structure in the second segment of the cache memory, where accessing the first segment includes accessing the first data structure and accessing the second segment includes accessing the second data structure. The data structures may be doubly linked ring lists of blocks of data. Each block of data may correspond to a track on a disk drive. The cache memory may also include a plurality of slots, each corresponding to a portion of the cache memory, where each of the slots is mapped to at least one of the first and second segments of the cache memory. The slots may be mapped to the segments using a formula or a table. The groups may be mapped to particular ones of the segments using a table. The table may include group identifiers and corresponding masks. The masks may be binary values that have a "one" bit in an Nth bit position to indicate that a group is assigned to an Nth segment.

According further to the present invention, a storage device includes a plurality of disk drives, a plurality of disk interface units, each being coupled to one of the disk drives, a bus that interconnects the disk interface units and a cache memory, coupled to the bus, the cache memory having a first segment that is accessed on behalf of a first group of external host systems coupled to the storage device and a second segment that is accessed on behalf of a second group of external host systems coupled to the storage device, where at least a portion of the second segment of the cache memory is not part of the first segment of the cache memory.

According further to the present invention, storing data in a cache memory of a storage device includes providing access to a first segment of the cache memory on behalf of a first group of external host systems coupled to the storage device, providing access to a second segment of the cache memory on behalf of a second group of external host systems coupled to the storage device where at least a portion of the second segment of the cache memory is not part of the first segment of the cache memory, in response to a request for a block of cache memory by an external host system of the first group, determining availability of a block of cache memory in the first segment of the cache memory, and in response to no blocks of cache memory in the first segment being available, providing a block of cache memory from the second segment for use by the external host system of the first group. Storing data in a cache memory of a storage device may also include providing a first data structure in the first segment of the cache memory and providing a second data structure in the second segment of the cache memory, where accessing the first segment includes accessing the first data structure and accessing the second segment includes accessing the second data structure. The data structures may be doubly linked ring lists of blocks of data. Each block of data may correspond to a track on a disk drive.

BRIEF DESCRIPTION OF DRAWINGS

FIG. 10 is a table illustrating mapping a slot numbers to particular LRU's according to the present invention.

DETAILED DESCRIPTION OF THE PREFERRED EMBODIMENT(S)

Figure 1:
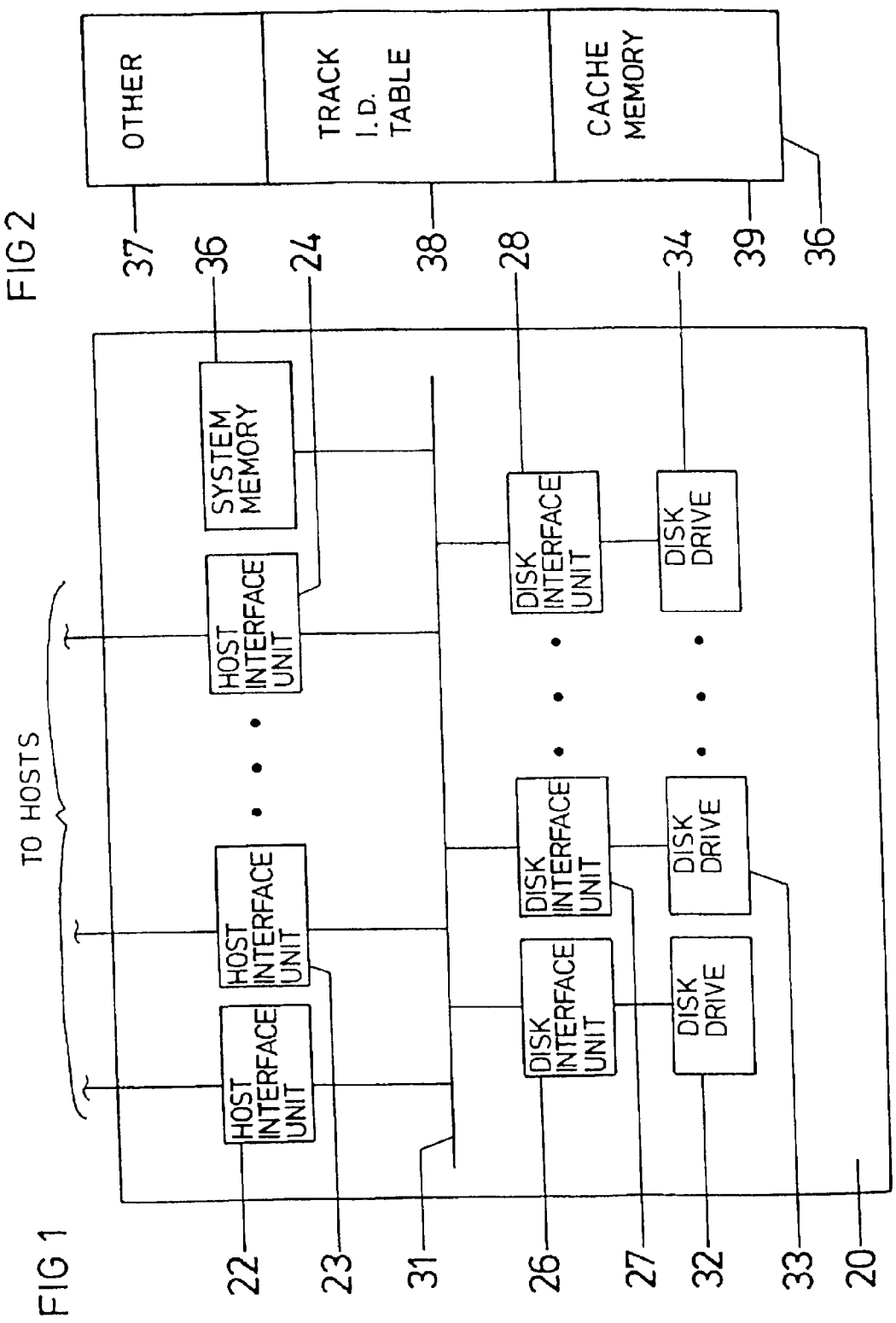
FIG. 1 is a schematic diagram of a system that uses the present invention.

Referring to FIG. 1, a data storage device 20 includes a plurality of host interface units 22–24, a plurality of disk interface units 26–28, and a plurality of disk drives 32–34, each of which is coupled to a respective one of the disk interface units 26–28. The host interface units 22–24 may be coupled to one or more external host systems (not shown), such as a computer that reads and writes data to a disk drive system.

The storage device 20 may perform operations that would otherwise be performed by a conventional disk drive system connected to each of the host systems. Thus, the storage device 20 receives disk commands via the host interface units 22–24 and provides disk data, from the disk drives 32–34, to the host systems through the host interface units 22–24. However, the host systems connected to the storage device 20 do not access the disk drives 32–34 directly, but rather, the host systems access the storage device 20 by requesting use of one or more logical disks. The storage device 20 translates requests from the hosts for access to particular logical disks into physical locations on the disk drives 32–34. A bus 31 provides communication between the host interface units 22–24 and the disk interface units 26–28.

A request from a host is provided through one of the host interface units 22–24 in the form of a logical disk number, cylinder number, and track number. That is, a host reads or writes data by specifying the logical disk number, cylinder number, and track number. This request passes through the respective one of the host interface units 22–24 to the appropriate one of the disk interface units 26–28 which then accesses the data on the appropriate one on the disk drives 32–34 and provides the data to the appropriate one of host interface units 22–24.

In some instances, it may be more efficient to reduce the number of physical disk accesses made to the disk drives 32–34 by caching some of the data that is requested. For that purpose, a system memory 36 is coupled to the bus 31 and, as described in more detail hereinafter, provides storage for caching data that is transferred between the disk drives 32–34 and the host interface units 22–24. Each of the disk interface units 26–28 contains a processor and runs processes that directly access the system memory 36. Thus, as described in more detail below, using the system memory 36 for caching necessitates use of techniques that inhibit problems that may occur if two or more processes attempt to access critical data simultaneously.

Figure 2:
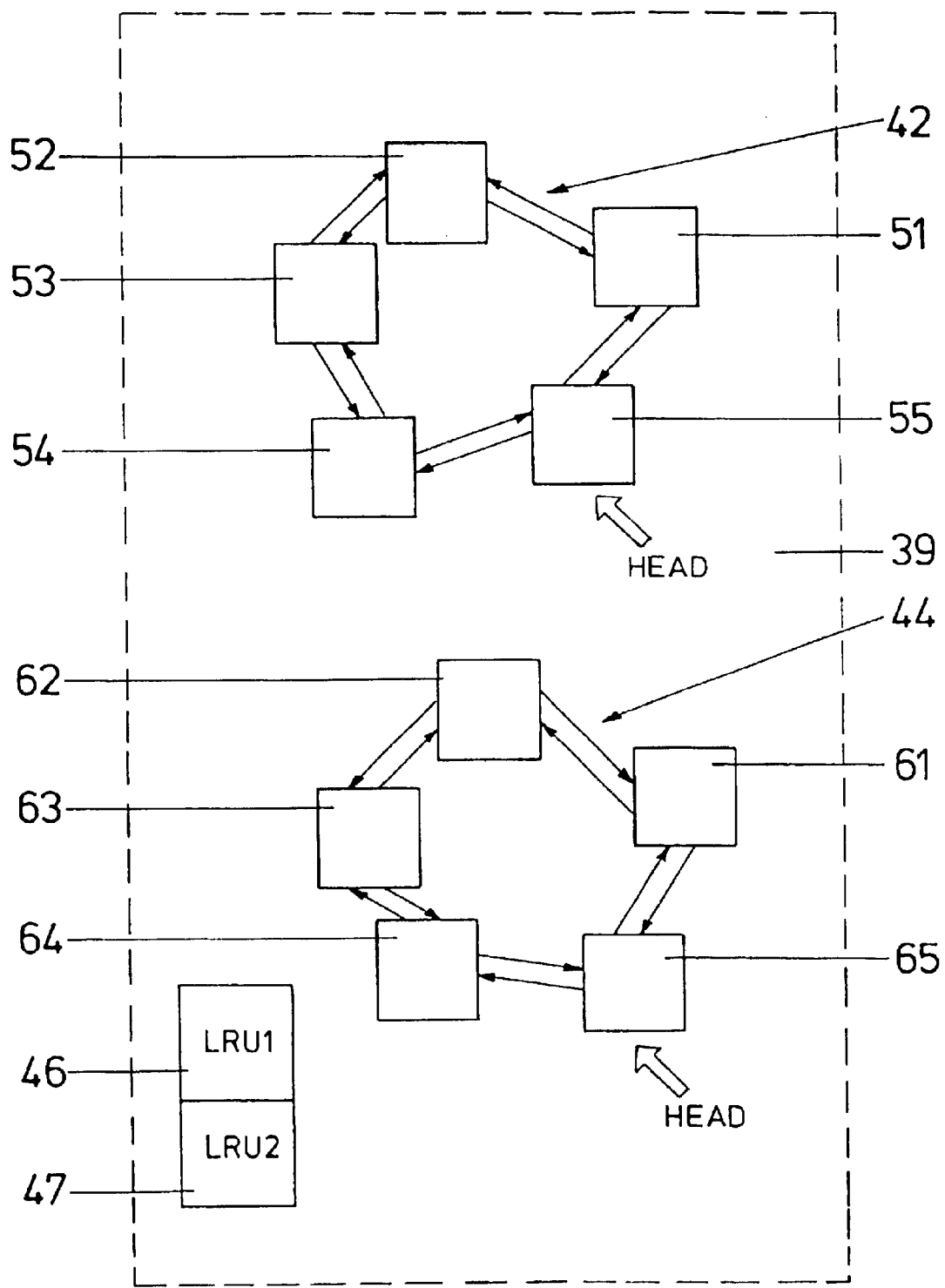
FIG. 2 is a detailed schematic diagram showing the memory of the system of FIG. 1.

Referring to FIG. 2, a schematic diagram shows the system memory 36 in more detail. The system memory includes other memory 37 (containing other system data components not discussed herein), a track i.d. table 38, and a cache memory 39. The cache memory 39, and structure thereof, is discussed in more detail hereinafter. The track i.d. table 38 is a table that contains an entry for each and every one of the tracks on the disk drives 32–34. The entry for each of the tracks indicates whether the particular track is in the cache memory 39 and, if so, if the data in cache memory has been written to but not yet copied back to the disk drives 32–34. The track i.d. table 38 is thus used to implement a somewhat conventional direct mapped cache system where, for every disk memory location, there is a corresponding indicator denoting whether the data is in the cache.

Figure 3:
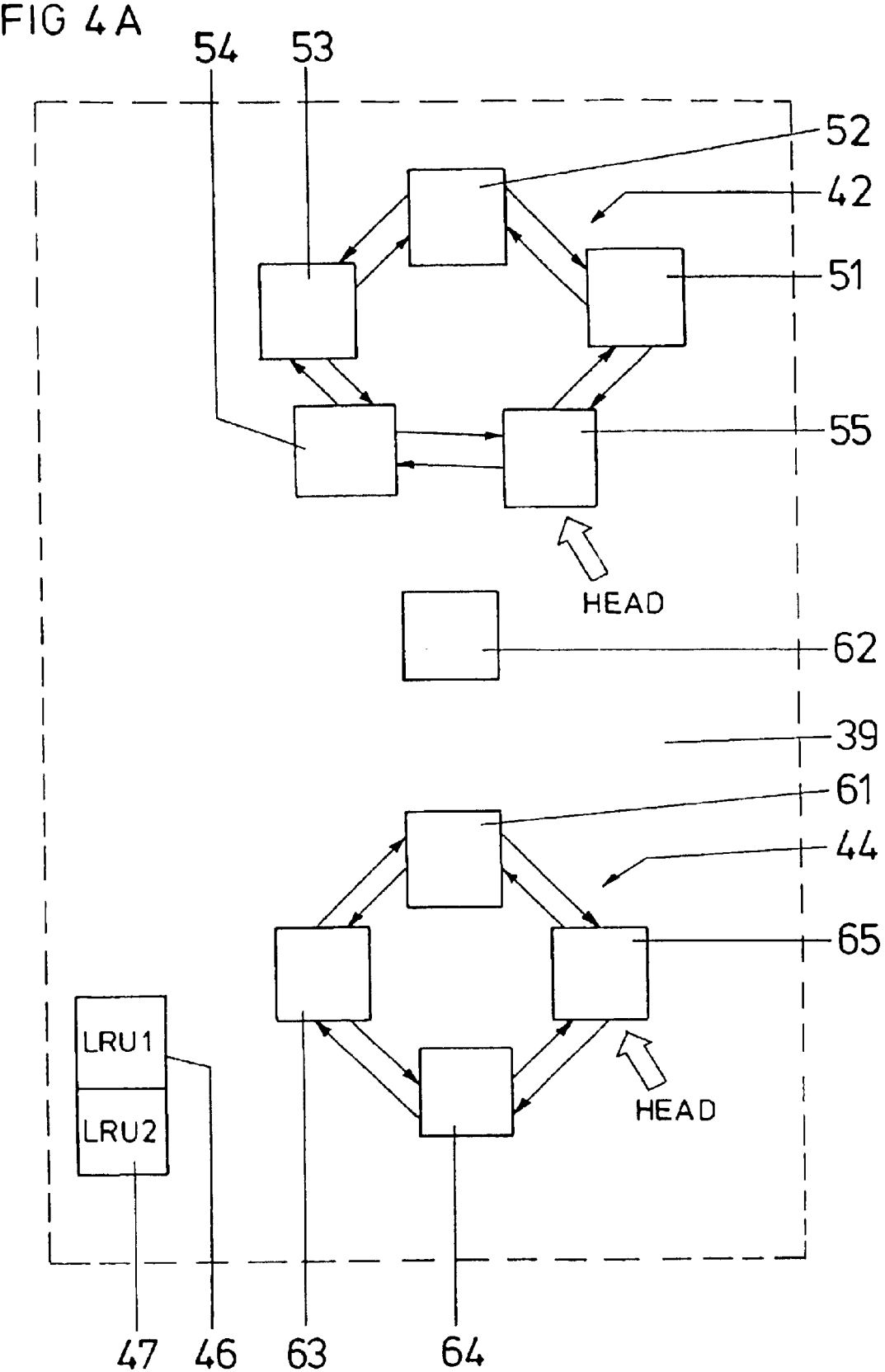
FIG. 3 is a detailed schematic diagram showing the data stored in cache memory according to the present invention.

Referring to FIG. 3, a schematic diagram shows the cache memory 39 in more detail. The cache memory includes a first logical ring unit (LRU) 42 and a second LRU 44. The cache memory 39 also includes first and second software LRU locks 46,47 which are discussed in more detail hereinafter.

Note that although the exemplary embodiment shown herein uses the two LRU's 42, 44, it will be appreciated by one of ordinary skill in the art that the system described herein may be generalized to any number of LRU's. In fact, the technique may be further generalized to work with any number of portions of the cache memory 39.

The LRU 42 is made up of a plurality of memory blocks 51–55, each of which may correspond to a track on one of the disk drives 32–34. Each of the blocks 51–55 may corresponds to a slot of the cache memory 39, where a slot simply refers to a section of the cache memory 39 used for one of the blocks 51–55. In addition, a "slot number" may be used to refer to a particular one of the blocks 51–55, where the slots are numbered sequentially, starting at zero, according to the relative location thereof in the cache memory 39. Thus, the slot having the lowest memory address could be slot zero, the slot having the next highest memory address could be slot one, etc. In one embodiment, each of the tracks of the disk drives 32–34, and in each of the memory blocks 51–55, contains 50,368 bytes of memory. However, it will be appreciated by one of ordinary skill in the art that the sizes may vary. In addition, it will be appreciated by one of ordinary skill in the art that the system described herein may be adapted so that the size of each of the blocks 51–55 does not necessarily correspond to the size of each of the tracks of the disk drives 32–34. For example, each of the blocks 51–55 may be a multiple of the track size or may be a fraction of the track size.

The second LRU 44 also contains a plurality of memory blocks 61–65 that are analogous to the memory blocks 51–55 of the first LRU 42. The LRU 42 includes a head pointer that points to the block 55 which was most recently added to the LRU 42. Similarly, the LRU 44 also includes a head pointer that points to the block 65 that was most recently added to the LRU 44.

The processors on any one of the disk interface units 26–28 may manipulate either the first LRU 42 or the second LRU 44 to, for example, add a block thereto or remove a block therefrom. Since each of the LRU's 42, 44 is constructed as a doubly linked ring list (a relatively complex data structure) only one processor at a time is allowed access to one of the LRU's 42, 44 at a time. This is accomplished by using the software locks 46,47 which are a type of conventional semaphore that allows a processor to obtain exclusive access to one of the LRU's 42, 44, thus inhibiting simultaneous access. In one embodiment, a processor of one of the disk interface units 26–28 that desires access to one of the LRU's 42, 44 first locks the memory hardware using a conventional hardware memory lock, to prevent access to the software locks 46, 47. Once the hardware lock has been accomplished, the processor that desires access then obtains one of the software locks 46, 47, after which the hardware lock may be released. Note that the software lock 46 may be used for the LRU 42 while the software lock 47 may be used for the LRU 44.

A feature of the system described herein is that it is possible for one of the disk interface units 26–28 to have access to, for example, the first LRU 42 while another one of the disk interface units 26–28 simultaneously has access to the second LRU 44. Thus, two processors may simultaneously have access to the LRU's 42, 44. Allowing simultaneous access reduces the instances of processors waiting for access to the cache. Simultaneous access by two processors to the LRU's 42, 44 is possible because each of the LRU's 42, 44 is a standalone data structure that is not affected by modifications to the other data structure. Thus, manipulation of the linked ring list of the LRU 42 does not affect the linked ring list of the LRU 44. Note that, in some embodiments, it may be useful from time to time to lock the entire cache memory 39 by accessing and holding each of the software locks 46, 47 until all of the LRU's 42, 44 are locked.

Each time access to data is requested by one of the hosts, the track i.d. table 38 is examined to determine if the data is already in the cache memory 39. If the data is already in the cache memory 39, then the cache memory 39 is accessed rather than accessing the disk drives 32–34. In the case of a read operation, this may be performed by the host interface units 22–24 as well as, by the disk interface units 26–28. Otherwise, if the requested data is not already in the cache memory 39, it is fetched and placed in the cache memory 39. In that case, the block associated with the data is assigned to one of the LRU's 42, 44, in a manner described in more detail hereinafter.

In some embodiments, the slot number is used to determine which of the LRU's 42, 44 contains particular data. For example, in a system with two LRU's, it is possible to have the odd slot numbers correspond to one of the LRU's and have the even slot numbers correspond to the other one of the LRU's. For a system with N LRU's, a slot number may be mapped to a particular LRU using the formula (slot number) mod N. This technique provides a convenient mechanism for determining which LRU contains particular data, since the track I.D. table 38 indicates where in the cache memory particular data exists, and this information may be used to determine a slot number, which maps to a particular LRU.

Figure 4:
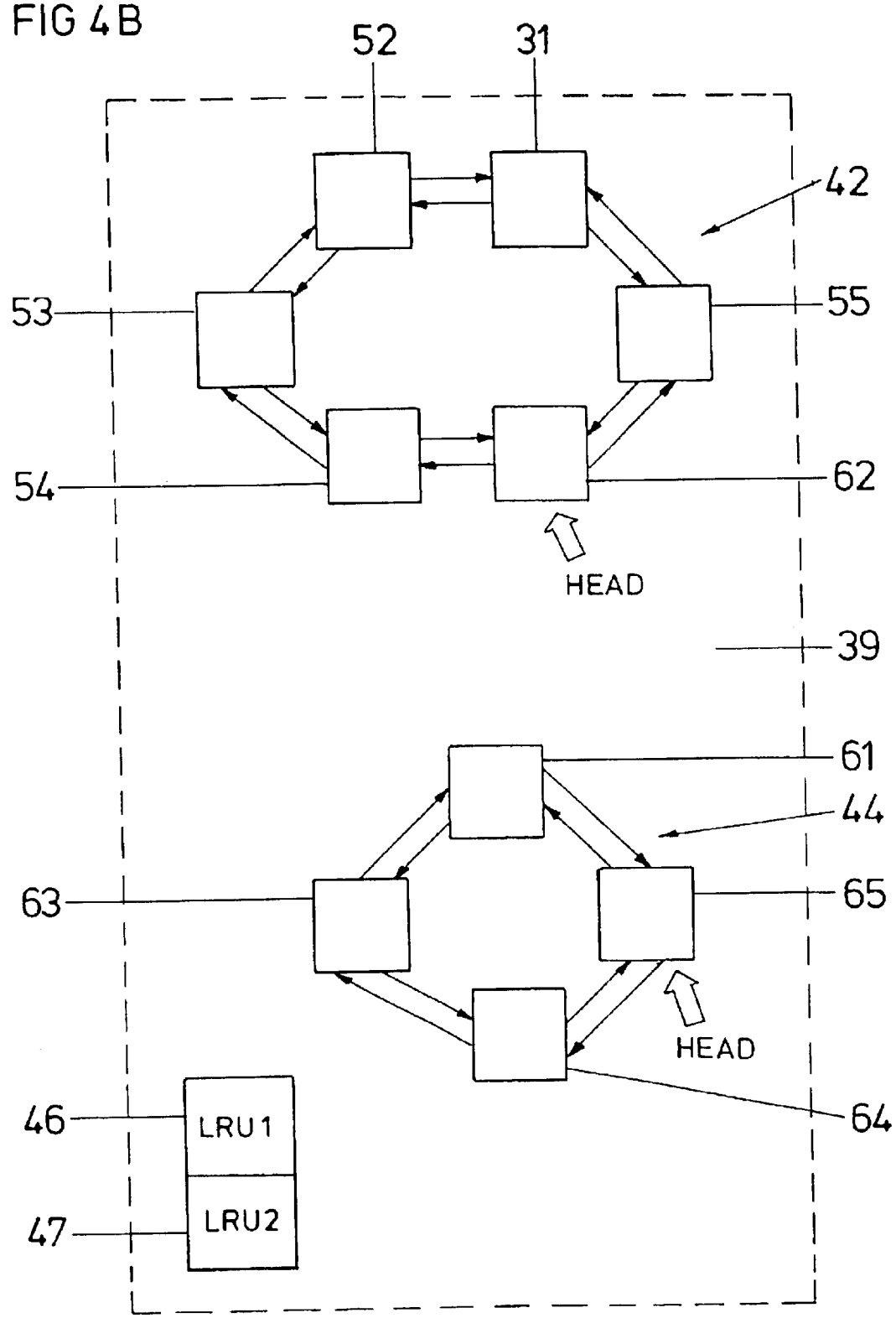
FIGS. 4A and 4B show the handling of a modified block of data in cache memory according to the present invention.

Referring to FIGS. 4A and 4B, the process for modifying a block in the cache 39 is illustrated. When a host connected to the system 20 modifies data that is stored in the cache 39, the host sends a disk write command through the appropriate one of one of the host interface units 22–24. If the track of the disk drive 32–34 that is being written to is in the cache 39 then the block that is being written to, in the example of FIGS. 4A and 4B the block 62, is first removed from the LRU 44 to protect the block 62 from being manipulated by another process during the write operation. When the block 62 is removed for a write operation, the corresponding entry in the track i.d. table 38 is modified to indicate the write operation. Once the block 62 has been removed from the LRU 44, the software lock 47 for the second LRU 44 is released so that other processes may modify the second LRU 44. Once the block 62 has been separated from the second LRU 44, the block 62 may be modified using data provided by one of the host interface units 22–24. Following modification, the data from the block 62 is copied back to the track of the disk drives 32–34 corresponding to the block 62.

As shown in FIG. 4B, once the block 62 is copied to the disk drives 32–34, the block 62 is returned back to one of the LRU's 42, 44. In the example shown in FIG. 4B,the block 62 is returned to the first LRU 42 rather than back to the second LRU 44. In other embodiments, the block 62 would always be returned to the LRU 44 and, generally, once a block is assigned to a particular LRU, it is not moved.

Each time a new block is added to the cache 39, and each time a block is returned to a particular one of the LRU's 42, 44 after a write operation, the block is assigned to a particular one of the LRU's 42, 44. In one embodiment, the assignment of a block to a particular one of the LRU's 42, 44 is made by taking a random or pseudo random number, such as the wall clock time modulo the number of LRU's 42, 44 which, in this case, is two. Thus, a block that is modified such as the block 62 illustrated in FIG's. 4A and 4B, or a new block that is accessed from the disks 32–34, is assigned a particular one of the LRU's 42, 44 in a random manner, thus providing a mechanism for balancing the number of blocks in the LRU's 42, 44. Note that, in instances where the slot number is mapped to the LRU, then once the particular LRU for a block has been assigned, it may be possible to pick a particular slot (and thus slot number) to cause the block to be placed on the assigned LRU.

Figure 5:
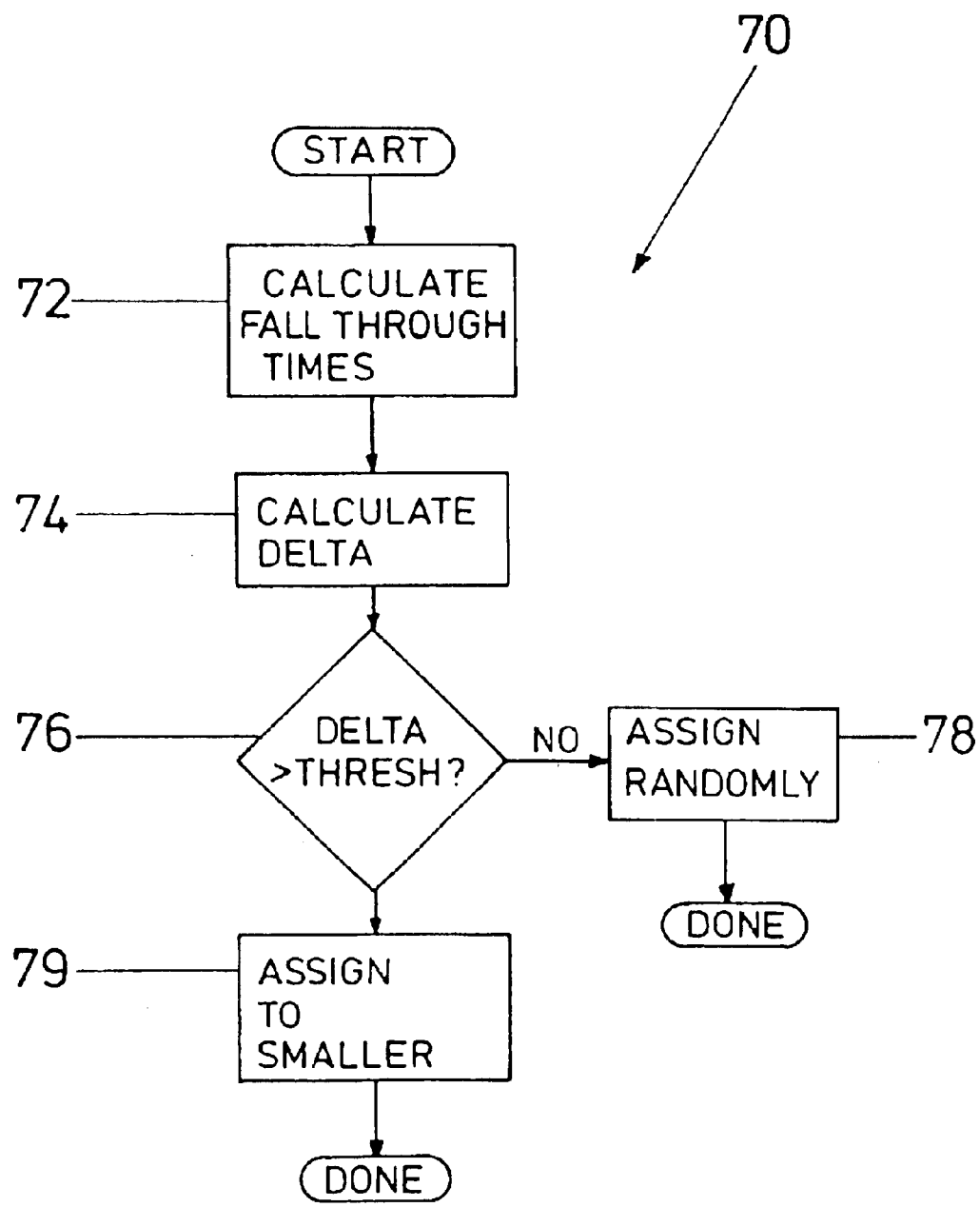
FIG. 5 is a flow chart that illustrates one technique for selecting an LRU for a block of data according to the present invention.

Referring to FIG. 5, a flow chart 70, illustrates steps for assigning a block to one of the LRU's 42, 44. At a first step 72, the fall through times for each of the LRU's 42, 44 is calculated. The fall through time may be determined by examining an amount of time that a block spends on the LRU, noting that the oldest block is discarded from the LRU when a new block is added. Each time a block is removed to make room for a new block, the fall through time may be determined by subtracting the time that the block is removed from the time that the block was added. Thus, an LRU with a particularly small fall through time may have a relatively small number of blocks stored thereon while an LRU with a relatively large fall through time may have a relatively large number of blocks assigned thereto.

Following step 72 is a step 74 where the difference between the fall through times of the LRU's 42, 44 is calculated. The difference is calculated by subtracting the fall through time of one of the LRU's 42, 44 from the fall through time of another one of the LRU's 42, 44. Following the step 74 is a test step 76 where is determined if the delta value calculated at the step 74 is greater than a particular threshold. The threshold may be set to an absolute number or may be calculated as a percentage of either the greater or the lesser of the fall through time. The threshold value may be determined according to a few simple empirical observations and calculations, the performance of which is straight forward to one of ordinary skill in the art.

If it is determined at the test step 76 that the delta is not greater than a particular threshold, then control passes from the step 76 to step 78 where the block is randomly assigned to one of the LRU's 42, 44 in a manner analogous to that discussed above. Alternatively, if it is determined at the test step 76 that the value of the delta is greater than a particular threshold, then control passes from the test step 76 to step 79 where the new block is assigned to the LRU having the smaller fall through time.

Note that the system described herein may be implemented using any number of LRU's. As the number of LRU's is increased, the amount of time a block spends on an LRU may decrease. However, the number of collisions of processors waiting for access to the LRU's also decreases. Note also that data structures other than the doubly linked ring list may be used for each of the LRU's, provided that a mechanism exists to allow only one process at a time to modify the data structures thereof. Note also that the invention may be practiced with hardware other than that shown herein configured to operate in a manner different than that illustrated herein. The host interface units 22–24 may also control the cache 39.

Figures 6, 7:
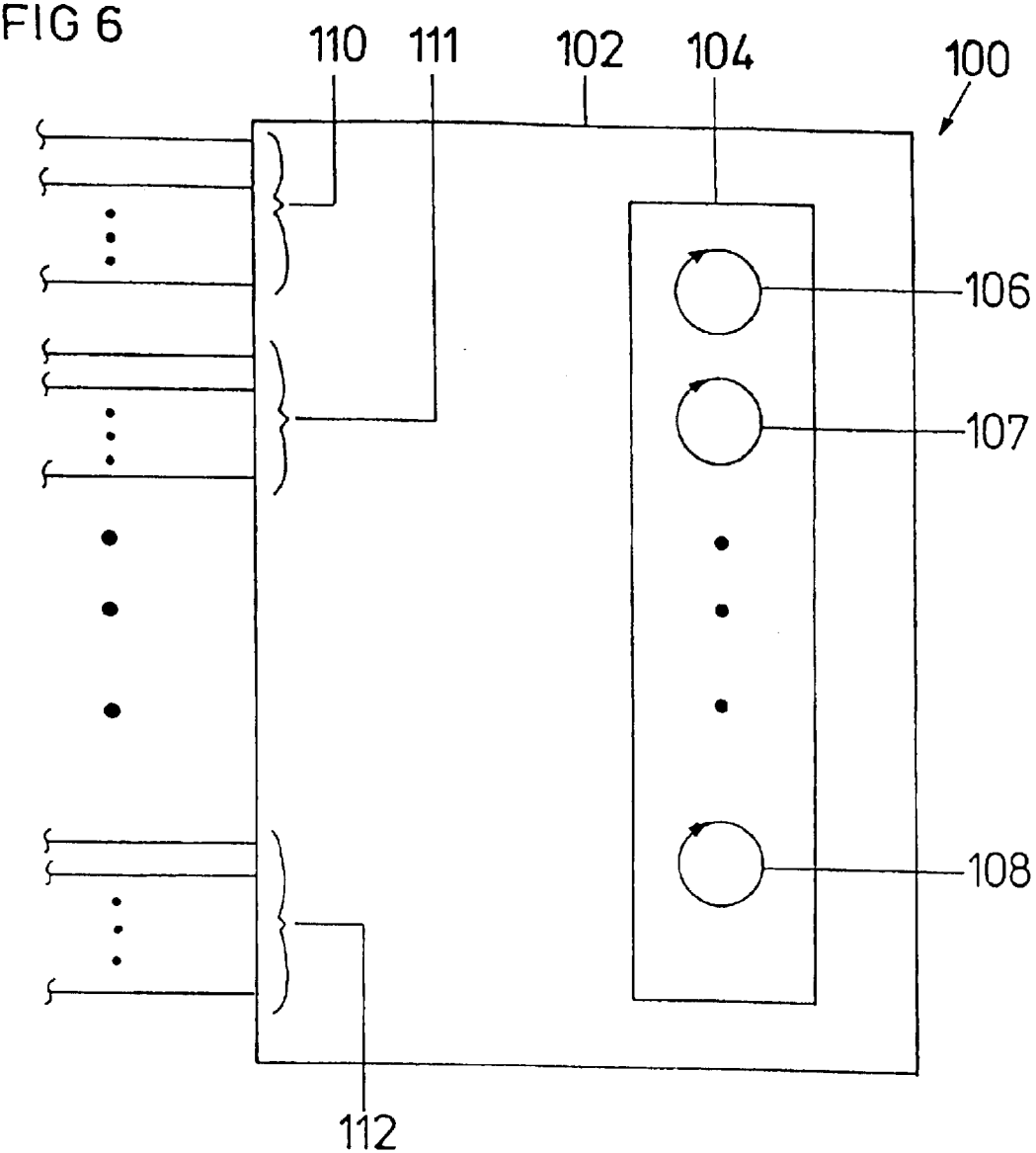
FIG. 6 is a schematic diagram showing a data storage device having multiple LRU's according to the present invention.
FIG. 7 is a table illustrating correlation of groups and LRU masks according to the present invention.

Referring to FIG. 6, a schematic diagram 100 shows a storage device 102 having a cache 104 containing a plurality of LRU's 106–108. Operation of the LRU's 106–108 is consistent with the discussion above, except that the assignment of blocks to the LRU's 106–108 may be made according to various techniques discussed in more detail below. The data storage device 102 includes a plurality of connections thereto 110–112 for coupling external host systems (not shown) to the data storage device 102. The host connections 110–112 may be sorted into groups so that, for example, the host connections 110 represent a first group, the host connections 111 represent a second group, and the host connections 112 represent a third group.

As discussed in more detail below, different groups of the host connections 110–112 may be provided with different access, priority, and level of service with respect to the LRU's 106–108. Thus, for example, the group of host connections 110 may be assigned a first segment of the cache 104 having more memory space available thereto than the group of host connections 111. This may be accomplished, for example, by mapping each of the groups of host connections 110–112 to specific ones of the LRU's 106–108. Thus, a segment may include one or more LRU's or, generally, refer to any subset of the cache memory. A first group of the host connections 110–112 may be provided with greater access to the cache 104 (i.e., a segment of the cache 104 corresponding to a larger amount of memory space) by being mapped to more of the LRU's 106–108 than a second group of the host connections 110–112 being provided with a lower level of service. In addition, a first group of the host connections 110–112 may be assigned to relatively larger LRU's (i.e., LRU's containing more blocks) than a second group of the host connections 110–112.

Referring to FIG. 7, a table 120 illustrates a technique for assigning particular LRU's to particular groups. The example of FIG. 7 assumes that there are four groups of external host connections and eight LRU's. The table 120 associates each of the groups with a particular LRU mask, which is an 8-bit value indicating which of the LRU's are assigned to the corresponding group. Each of the bit positions of the LRU mask corresponds to a particular one of the eight LRU's. In addition, a value of one for a bit indicates that the corresponding LRU is assigned to the group and a value of zero indicates that the corresponding LRU is not assigned to the group. Thus, in the example of FIG. 7, group 1 is assigned to three LRU's, groups 2 and 3 are each assigned two of the LRU's, and group 4 is assigned only one of the LRU's. In the example of FIG. 7, none of the LRU's are assigned to more than one group. However, in other embodiments, it may be possible to have more than one group assigned to the same LRU (i.e., have groups share particular LRU's).

Assuming that all of the LRU's are the same size (embodiments having LRU's of different sizes are discussed below), then the table 120 shows that the external host systems connected at the group 1 connections are assigned to a segment corresponding to ⅜ of the cache, groups 2 and 3 are each assigned to segments corresponding to ¼ of the cache, and group 4 is assigned to a segment corresponding to ⅛ of the cache. The particular allocations among groups may be made for a variety of reasons, such as group 1 having more external host systems or having external host systems that have greater storage needs. In addition, the service levels of the various groups reflected in the table 120 may simply indicate that group 1 is being provided a higher level of service for any one of a variety of other reasons, including, for example, payment of additional fees to a storage provider that controls the storage device 102.

Enforcement of the policy set forth in the table 120 may be accomplished using the slot number/LRU assignment rules discussed above. That is, assuming that an LRU is associated with a particular slot number using the formula LRU number=slot number (modulo) N, where N is the number of LRU's, then a request for a block of cache is processed by assigning a slot number that corresponds to the LRU assigned to the group of the device on whose behalf the request is made. For example, if there are ten LRU's and if a requesting device is associated with a group that has access to LRU number five, then a request for a cache block from the device will cause a slot number to be assigned such that the slot number modulo ten equals five (e.g., slot number five, fifteen, twenty-five, etc.).

Figure 8:
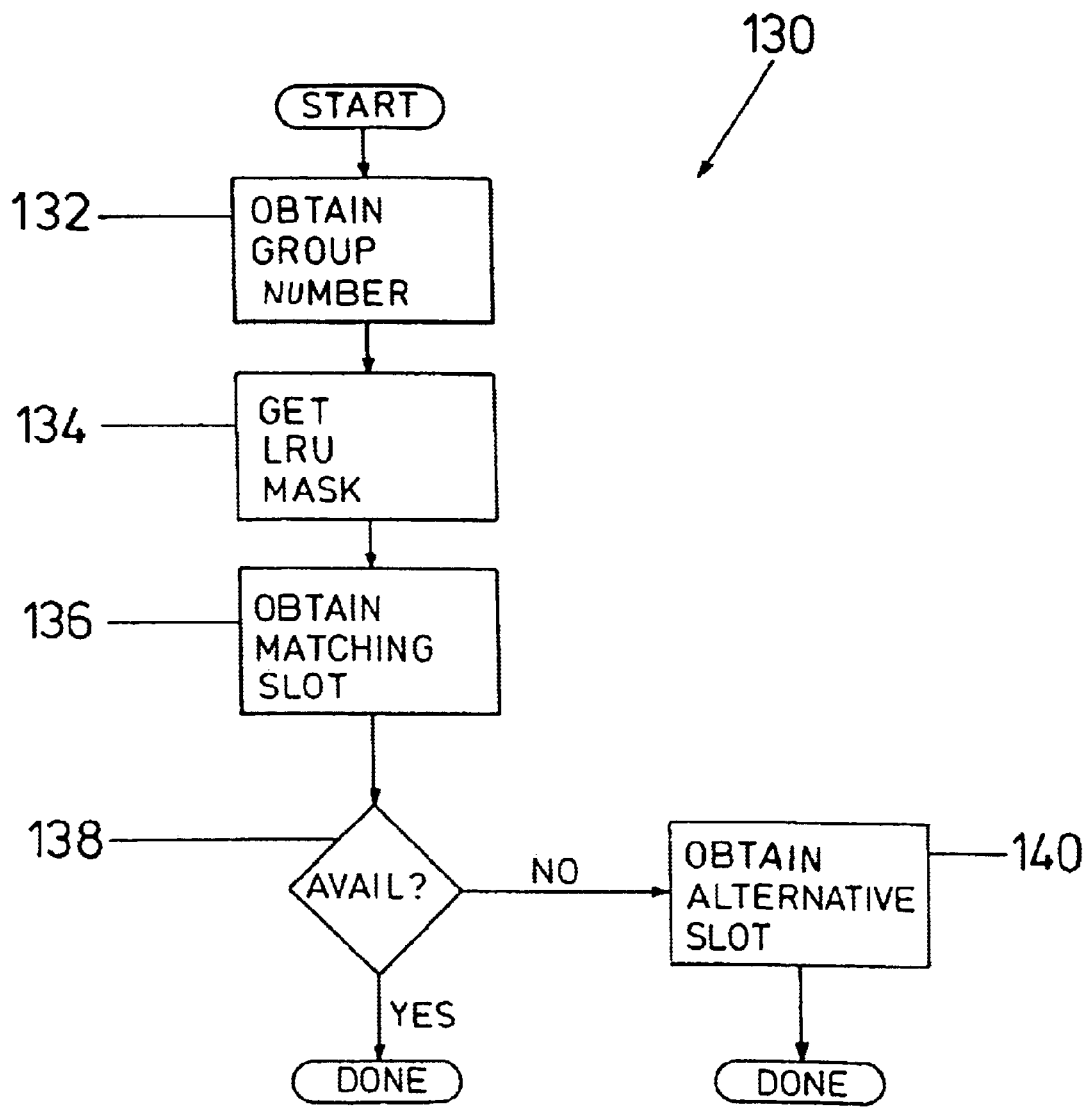
FIG. 8 is a flow chart illustrating assignment of a slot according to the present invention.

Referring to FIG. 8, a flow chart 130 illustrates steps performed in connection with obtaining cache memory on behalf of a requesting external host system. Processing begins at a first step 132 where the group number is obtained for the connection corresponding to the external host system on whose behalf the cache block is being requested. As shown in FIG. 6 and discussed above, group numbers may be mapped to the host connections 110–112 of the storage device 102. Each of the host connections 110–112 may have a unique identifier so that a conventional table may be provided (not shown) that maps the identifier of the particular one of the host connections 10–112 with the group number.

Following the step 132 is a step 134 where the LRU mask is obtained. The LRU mask is obtained using a table similar to the table 120 discussed above in connection with FIG. 7. Following the step 134 is a step 136 where a slot number, matching the assigned LRU's from the LRU mask obtained at the step 134, is returned. Returning a matching slot number at the step 136 is discussed in more detail hereinafter.

Following the step 136 is a test step 138 which determines if a matching slot number was obtained at the step 136. Note that it is possible that there are no available slots corresponding to the LRU's assigned to the group and that thus, it may not be possible to return a matching slot number at the step 136. Slots may become unavailable for a variety of reasons, such as when a slot corresponds to a block being modified. The routine that obtains the matching slot number at the step 136 may indicate no matching slots are available by returning a particular value that does not correspond to any slot number, such as −1.

If it is determined at the test step 138 that a matching slot is available, then processing is complete. Otherwise, if no matching slot number is available, then control passes from the step 138 to a step 140 where an alternative slot number is returned. Returning an alternative slot number at the step 140 is discussed in more detail hereinafter.

Figure 9:
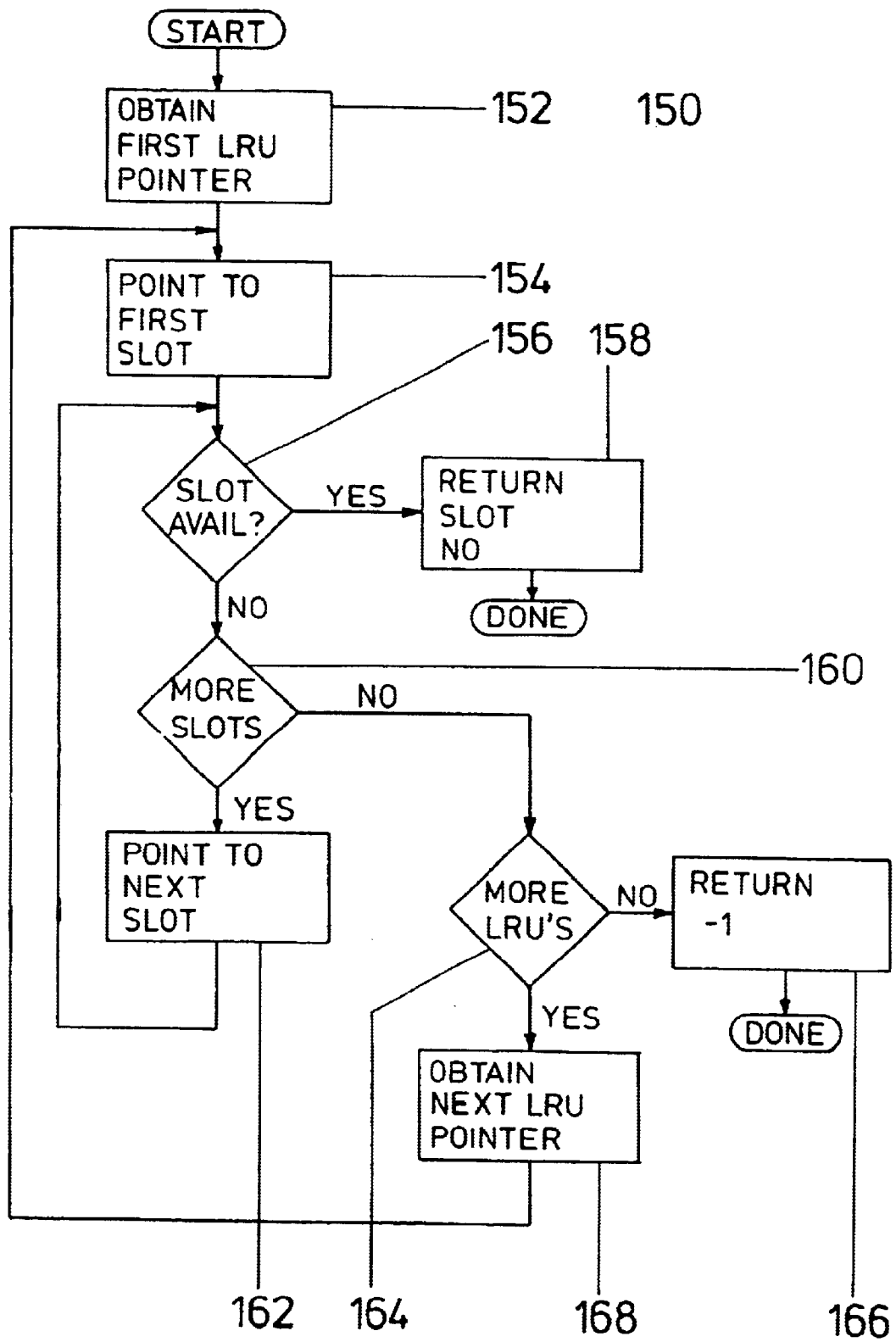
FIG. 9 is a flow chart illustrating obtaining a matching slot according to the present invention.

Referring to FIG. 9, a flow chart 150 illustrates in detail the steps performed in connection with returning a matching slot number at the step 136 of FIG. 8. Generally, the process of returning a matching slot number entails iterating through all of the slots for LRU's of the group until a free slot is found. For embodiments discussed herein, there is a pointer that points to a list of slots for each LRU and there is a pointer to each of the LRU's (i.e., a pointer to each list of slots for each LRU). Thus, the process includes a first (outer) iteration loop through all of the LRU's assigned to the group on whose behalf the slot is being requested and a second (inner) iteration loop to examine all the slots for each LRU to determine if any of the slots are free.

Processing begins at a first step 152 where the first LRU for the group is pointed to. Determining LRU's which correspond to the group may be done, for example, by examining the appropriate bit of the LRU mask to determine if it is a one or zero for the group, as discussed above in connection with FIG. 7. Following the step 152 is a step 154 where first slot for the LRU is pointed to. As discussed above, slot numbers may be mapped to particular LRU's using a variety of techniques, including the formula LRU number slot number modulo N, where N is the number of LRU's. Other techniques for mapping slot numbers to LRU's are discussed below.

Following the step 154 is a test step 156 where it is determined if the slot that is being pointed to is available for use. If it is determined at the test step 156 that the slot being point to is available for use, then control passes from the step 156 to a step 158 where the slot number is returned to the calling routine (i.e., the process shown in FIG. 8). Otherwise, if it is determined at the test step 156 that the slot is not available, then control passes from the step 156 to a test step 160 where it is determined if there are more slots in the LRU to be examined. If there are more slots in the LRU, then control passes from the step 160 to a step 162 where the next slot in the LRU is pointed to. Following the step 162, control passes back to the step 156 to perform the next iteration, thus closing the second (inner) loop.

If all of the slots of the LRU have been examined, then control passes from the test step 160 to a test step 164 where it is determined if there are more LRU's for the group that can be examined. As discussed above, more than one LRU may be assigned to a group. If it is determined at the test step 164 that there are no more LRU's for the group to be examined, then control passes from the step 164 to a step 166 where −1 is returned (to the calling routine) indicating that there are no matching slots. After the step 166, processing is complete.

If it is determined at the test step 164 that there are more LRU's to be examined, then control passes from the step 164 to a step 168 where the pointer to the next LRU is obtained. Following the step 168, control transfers back to the step 154 to perform the next iteration, thus closing the first (outer) loop.

The step 140 of FIG. 8 where an alternative slot is obtained (if a matching slot is not available at the step 136) may be implemented in a variety of ways, which may involve "borrowing" a slot from another group. In one embodiment, the first available slot from another group is simply obtained at the step 140. The choice of which LRU is to donate a free slot may be made randomly. Other techniques could include returning an available slot from an LRU corresponding to another group with the greatest number of LRU's assigned thereto, returning a slot corresponding to an LRU with the most empty slots, and/or returning a slot corresponding to an LRU associated with a group having the largest percentage of available slots. Other techniques may be apparent to one of ordinary skill in the art.

Referring to FIG. 10, a table 170 illustrates a technique for mapping slot numbers to particular LRU's that is an alternative to using the formula LRU number=(slot number) modulo N, where N is the number of LRU's. The technique of FIG. 10 may be used to adjust the relative sizes of the LRU's. The table contains an entry for a slot number and a corresponding entry for an LRU number. Note that, for the illustrative example of the table 170 of FIG. 10, slots numbers zero and one correspond to LRU number one, slots two through five correspond to LRU number two, slot six corresponds to LRU number three, and slots seven through twelve correspond to LRU number four. Mapping the slots to the LRU's in this manner allows the LRU's to have different sizes. Thus, in some instances, it may be advantageous to assign a lower number of relatively large LRU's to a particular group rather than assign a larger number of relatively small LRU's, or vice versa. For example, rather than assign three LRU's having ten slots each to a particular group, it may be desirable to assign two LRU's having fifteen slots each to the group. Using the table 170 for mapping slot numbers to LRU's and the table 120 for mapping group numbers to LRU's provides for maximum flexibility in adjusting the performance levels, cache memory available, etc. for devices coupled to a storage device.

Note that the system described herein of assigning groups to segments of the cache may be implemented using different data structures and techniques for storing blocks of data in the cache. For example, it may be possible to simply assign segments of the cache for use by the various groups, with or without overlap (i.e., some groups sharing some portions of the segments). The blocks of data in the cache may be manipulated using any of a variety of conventional cache management techniques, including arranging and accessing the cache as a linear array of blocks, lists or arrays of pointers to the blocks, etc.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method of storing data in a cache memory of a storage device, comprising:
   apportioning the cache memory into slots, each having a particular slot number;
   providing a first segment of the cache memory having mapped thereto each of a first plurality of external host systems coupled to the storage device, said first segment including all of said slots having a first set of slot numbers;
   providing a second segment of the cache memory having mapped thereto each of a second plurality of external host systems coupled to the storage device, said second segment including all of said slots having a second set of slot numbers different from said first set of slot numbers, said second plurality of external host systems being different from said first plurality, wherein at least a portion of the second segment of the cache memory is not part of the first segment of the cache memory;
   providing a first data structure in the first segment of the cache memory; and
   providing a second data structure in the second segment of the cache memory wherein accessing the first segment includes accessing the first data structure and accessing the second segment includes accessing the second data structure, wherein the data structures are doubly linked ring lists of blocks of data.

2. A method, according to claim 1, wherein no portion of the second segment of the cache memory is part of the first segment.

3. A method, according to claim 1, wherein each block of data corresponds to a track on a disk drive.

4. A method, according to claim 1, wherein the external host systems are mapped to particular ones of the segments using a table.

5. A method, according to claim 4, wherein the table includes group identifiers and corresponding masks.

6. A method, according to claim 5, wherein the masks are binary values that have a "one" bit in an Nth bit position to indicate that a group is assigned to an Nth segment.

7. A method, according to claim 1, further comprising:
   in response to a request for a block of cache memory, determining availability of a block of cache memory for a plurality of external host systems mapped to the cache memory.

8. A method, according to claim 7, further comprising:
   in response to no blocks of cache memory for the plurality of external host systems being available, providing a block of cache memory corresponding to another plurality of external host systems.

9. A method, according to claim 8, wherein the block of cache memory that is provided is at least one of: a next available block, a block corresponding to a plurality of external host systems having a greatest number of blocks assigned thereto, a block corresponding to a plurality of external host systems having a greatest number of available blocks, and a block corresponding to a plurality of external host systems having a greatest percentage of available blocks.

10. A cache memory of a storage device, comprising:
    a plurality of cache memory slots, each having a particular slot number;
    a first segment of the cache memory having mapped thereto each of a first plurality of external host systems coupled to the storage device, said first segment including all of said slots having a first set of slot numbers;
    a second segment of the cache memory having mapped thereto each of a second plurality of external host systems coupled to the storage device, said second segment including all of said slots having a second set of slot numbers different from said first set of slot numbers, said second plurality of external host systems being different from said first plurality, wherein at least a portion of the second segment of the cache memory is not part of the first segment of the cache memory;
    a first data structure in the first segment of the cache memory; and
    a second data structure in the second segment of the cache memory, wherein accessing the first segment includes accessing the first data structure and accessing the second segment includes accessing the second data structure, wherein the data structures are doubly linked ring lists of blocks of data.

11. A cache memory, according to claim 10, wherein no portion of the second segment of the cache memory is part of the first segment.

12. A cache memory, according to claim 10, wherein each block of data corresponds to a track on a disk drive.

13. A cache memory, according to claim 10, wherein the first and second plurality of external host systems are mapped to particular ones of the segments using a table.

14. A cache memory, according to claim 13, wherein the table includes identifiers and corresponding masks.

15. A cache memory, according to claim 14, wherein the masks are binary values that have a "one" bit in an Nth bit position to indicate that a group is assigned to an Nth segment.

16. A storage device, comprising:

a plurality of disk drives;

a plurality of disk interface units, each being coupled to one of said disk drives;

a bus that interconnects said disk interface units; and a cache memory, coupled to said bus, said cache memory having a first segment made up of a plurality of cache slots having a first set of cache slot numbers assigned thereto and having mapped thereto each of a first plurality of external host systems coupled to the storage device and a second segment made up of a plurality of cache slots having a second set of cache slot numbers assigned thereto different from said first set of cache slot numbers and having mapped thereto each of a second plurality of external host systems coupled to the storage device, said second plurality being different from said first plurality, wherein at least a portion of the second segment of the cache memory is not part of the first segment of the cache memory and wherein there is a first data structure that is a doubly linked ring list of blocks of data in the first segment of the cache memory and a second data structure that is a doubly linked ring list of blocks of data in the second segment of the cache memory, and wherein accessing the first segment includes accessing the first data structure and accessing the second segment includes accessing the second data structure.

17. A method, of storing data in a cache memory of a storage device, comprising:

apportioning the cache memory into slots, each having a particular slot number;

providing a first segment of the cache memory having mapped thereto each of a first plurality of external host systems coupled to the storage device, said first segment including all of said slots having a first set of slot numbers;

providing a second segment of the cache memory having mapped thereto each of a second plurality of external host systems coupled to the storage device, said second segment including all of said slots having a second set of slot numbers different from said first set of slot numbers, said second plurality being different from said first plurality, wherein at least a portion of the second segment of the cache memory is not part of the first segment of the cache memory;

in response to a request for a block of cache memory by an external host system of the first plurality, determining availability of a block of cache memory in the first segment of the cache memory;

in response to no blocks of cache memory in the first segment being available, providing a block of cache memory from the second segment for use by the external host system of the first plurality of external host systems;

providing a first data structure in the first segment of the cache memory; and providing a second data structure in the second segment of the cache memory, wherein accessing the first segment includes accessing the first data structure and accessing the second segment includes accessing the second data structure, wherein the data structures are doubly linked ring lists of blocks of data.

18. A method, according to claim 17, wherein each block of data corresponds to a track on a disk drive.

* * * * *